US008268498B2

(12) United States Patent
Kumagae

(10) Patent No.: US 8,268,498 B2
(45) Date of Patent: Sep. 18, 2012

(54) FUEL CELL, FUEL CELL SYSTEM, AND ELECTRONIC DEVICE

(75) Inventor: Kiyoshi Kumagae, Kanagawa (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 12/727,919

(22) Filed: Mar. 19, 2010

(65) Prior Publication Data

US 2010/0248052 A1  Sep. 30, 2010

(30) Foreign Application Priority Data

Mar. 27, 2009  (JP) ................. 2009-079807

(51) Int. Cl.
  *H01M 8/02* (2006.01)
  *H01M 8/04* (2006.01)
(52) U.S. Cl. .................. 429/432; 429/443; 429/512
(58) Field of Classification Search .......... 429/432, 429/443, 512
  See application file for complete search history.

(56) References Cited

U.S. PATENT DOCUMENTS

| 6,808,838 | B1 * | 10/2004 | Wilson ............................ 429/410 |
| 7,544,436 | B2 * | 6/2009 | Yoshino et al. ............... 429/523 |
| 7,625,649 | B1 * | 12/2009 | Faghri et al. ................... 429/413 |
| 7,829,211 | B2 * | 11/2010 | Faghri et al. ................... 429/457 |
| 2006/0046123 | A1 * | 3/2006 | Guo et al. ........................ 429/34 |
| 2006/0269825 | A1 * | 11/2006 | Kim et al. ........................ 429/41 |
| 2009/0061271 | A1 * | 3/2009 | Sekino et al. ................... 429/26 |

FOREIGN PATENT DOCUMENTS

| JP | 2002056856 | A | * | 2/2002 |
| JP | 2003346862 | A | * | 12/2003 |
| JP | 2006-85931 | | | 3/2006 |
| JP | 2006107877 | A | * | 4/2006 |
| JP | 2007-80658 | | | 3/2007 |

\* cited by examiner

*Primary Examiner* — Gregg Cantelmo
(74) *Attorney, Agent, or Firm* — Oblon, Spivak, McClelland, Maier & Neustadt, L.L.P.

(57) ABSTRACT

A fuel cell with which deterioration of an anode electrode is able to be inhibited by an inexpensive means while generated carbon dioxide is removed, a fuel cell system including the same, and an electronic device including the same are provided. The fuel cell includes: a power generation section having an electrolyte between a cathode electrode and an anode electrode; an anode side platy member provided on the anode electrode side of the power generation section; a fuel vaporization chamber; a through hole that is formed in the anode platy member and gives passage between the anode electrode and the fuel vaporization chamber; a carbon dioxide exhaust section that guides carbon dioxide generated in the power generation section to each side face of the anode platy member or the fuel vaporization chamber; and a valve provided in the carbon dioxide exhaust section.

14 Claims, 13 Drawing Sheets

FUEL CELL, FUEL CELL SYSTEM, AND ELECTRONIC DEVICE

BACKGROUND OF THE INVENTION

1. Field of the Invention

The present invention relates to a fuel cell performing power generation by reaction between methanol or the like and oxygen, a fuel cell system including the same, and an electronic device including the same.

2. Description of the Related Art

As a power source of a small electronic device such as a mobile personal computer, applying a fuel cell has been considered. As a fuel for the fuel cell, a liquid fuel with a high energy density (for example, methanol) is desirably used.

In some case, the fuel is supplied as a dilute liquid fuel to an anode electrode. In addition, a vaporization type fuel cell in which a fuel not diluted but vaporized is supplied to an anode electrode has been considered (for example, see Japanese Unexamined Patent Application Publication Nos. 2007-80658 and 2006-85931). In Japanese Unexamined Patent Application Publication No. 2007-80658, after the vaporized fuel is once contained into a vaporized fuel container, such a vaporized fuel is supplied to the anode electrode. Further, in a side wall of the vaporized fuel container, an exhaust hole for exhausting generated gas containing carbon dioxide generated in the anode electrode is provided.

SUMMARY OF THE INVENTION

However, in Japanese Unexamined Patent Application Publication No. 2007-80658 in which the exhaust hole is provided in the vaporized fuel container, there has been a possibility that unreacted fuel is exhausted to lower power generation efficiency. Further, since the exhaust hole provided in the side wall of the vaporized fuel container is directly open outward, there has been a possibility that external air intrudes into the vaporized fuel container through the exhaust hole while the fuel cell stops power generation, and the anode electrode is deteriorated by oxygen contained in the external air when the fuel cell is restarted.

Meanwhile, in Japanese Unexamined Patent Application Publication No. 2006-85931, as a means for preventing external air intrusion into a cell while being stored, a method of containing a fuel cell body into an airtight container with its inside maintained in a state of reducing atmosphere or inert atmosphere is disclosed. However, in the method of Japanese Unexamined Patent Application Publication No. 2006-85931, since the fuel cell body is contained into the airtight container, the number of parts is increased and the device size is jumboized, leading to increased cost.

In view of the foregoing disadvantage, in the invention, it is desirable to provide a fuel cell with which deterioration of an anode electrode is able to be inhibited by an inexpensive means while generated carbon dioxide is removed, a fuel cell system including the same, and an electronic device including the same.

According to an embodiment of the invention, there is provided a fuel cell including a power generation section having an electrolyte between a cathode electrode and an anode electrode; an anode side platy member provided on the anode electrode side of the power generation section; a fuel vaporization chamber; a through hole that is formed in the anode platy member and gives passage between the anode electrode and the fuel vaporization chamber; a carbon dioxide exhaust section that guides carbon dioxide generated in the power generation section to each side face of the anode platy member or the fuel vaporization chamber; and a valve provided in the carbon dioxide exhaust section.

According to an embodiment of the invention, there is provided a fuel cell system including the fuel cell of the foregoing embodiment of the invention; and a control section for executing control to supply a fuel to the power generation section in the case where a voltage generated in the power generation section becomes a previously set voltage value or less at the time of stopping power generation.

According to an embodiment of the invention, there is provided an electronic device including the fuel cell of the foregoing embodiment of the invention.

In the fuel cell, the fuel cell system, and the electronic device of the embodiments of the invention, carbon dioxide generated in the power generation section by electrochemical reaction of the fuel is passed through the carbon dioxide exhaust section including the valve, is guided to each side face of the anode platy member or the fuel vaporization chamber, and then is exhausted outside. Further, after stopping power generation, intrusion of external air through the carbon dioxide exhaust section is inhibited.

In particular, in the fuel cell system of the embodiment of the invention, in a state of stopping power generation, a voltage generated in the power generation section is detected. In the case where the detected voltage becomes a certain voltage value or less, the fuel is supplied to the fuel electrode. Thereby, intrusion of external air is inhibited.

According to the fuel cell, the fuel cell system, or the electronic device of the embodiments of the invention, the carbon dioxide exhaust section is provided on each side face of the anode electrode or the fuel vaporization chamber, and the valve is provided in the carbon dioxide exhaust section. Thus, carbon dioxide generated by electrochemical reaction of the fuel is able to be exhausted outside through the carbon dioxide exhaust section while intrusion of external air is inhibited. Thereby, deterioration of the anode electrode is able to be inhibited.

In particular, according to the fuel cell system of the embodiment of the invention, in a state of stopping power generation, in the case where a voltage generated in the power generation section becomes a certain voltage value or less, the fuel is supplied to the fuel electrode. Thus, without separately providing a new mechanism for injecting inactive gas or water, oxygen pooled on the fuel electrode side is able to be removed, and increase of oxygen partial pressure is able to be inhibited. Therefore, deterioration of the anode electrode at the time of stopping power generation is able to be effectively inhibited.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings. The description will be given in the following order:
First Embodiment
1. Whole structure of a fuel cell
2. Method of manufacturing the fuel cell
Second embodiment (example of a fuel cell system including the fuel cell of the invention)
1. Structure of the fuel cell system
2. Operation of the fuel cell system
Example
Modified examples (modified examples of a through hole and a groove)
Application example

FIRST EMBODIMENT

Whole Structure of a Fuel Cell

Figure 1:
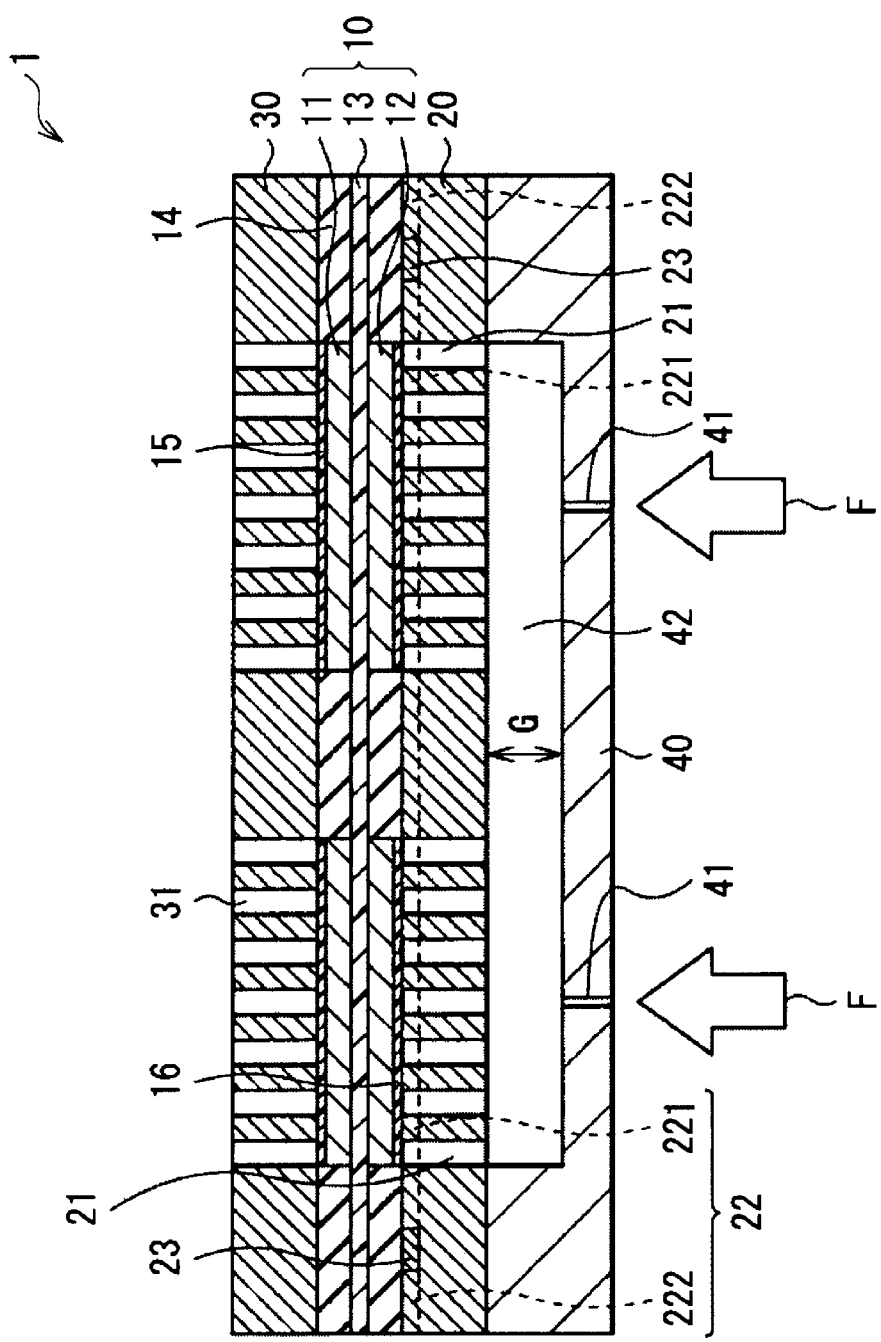
FIG. 1 is a cross sectional structure illustrating a structure of a fuel cell according to a first embodiment of the invention.
Figure 2:
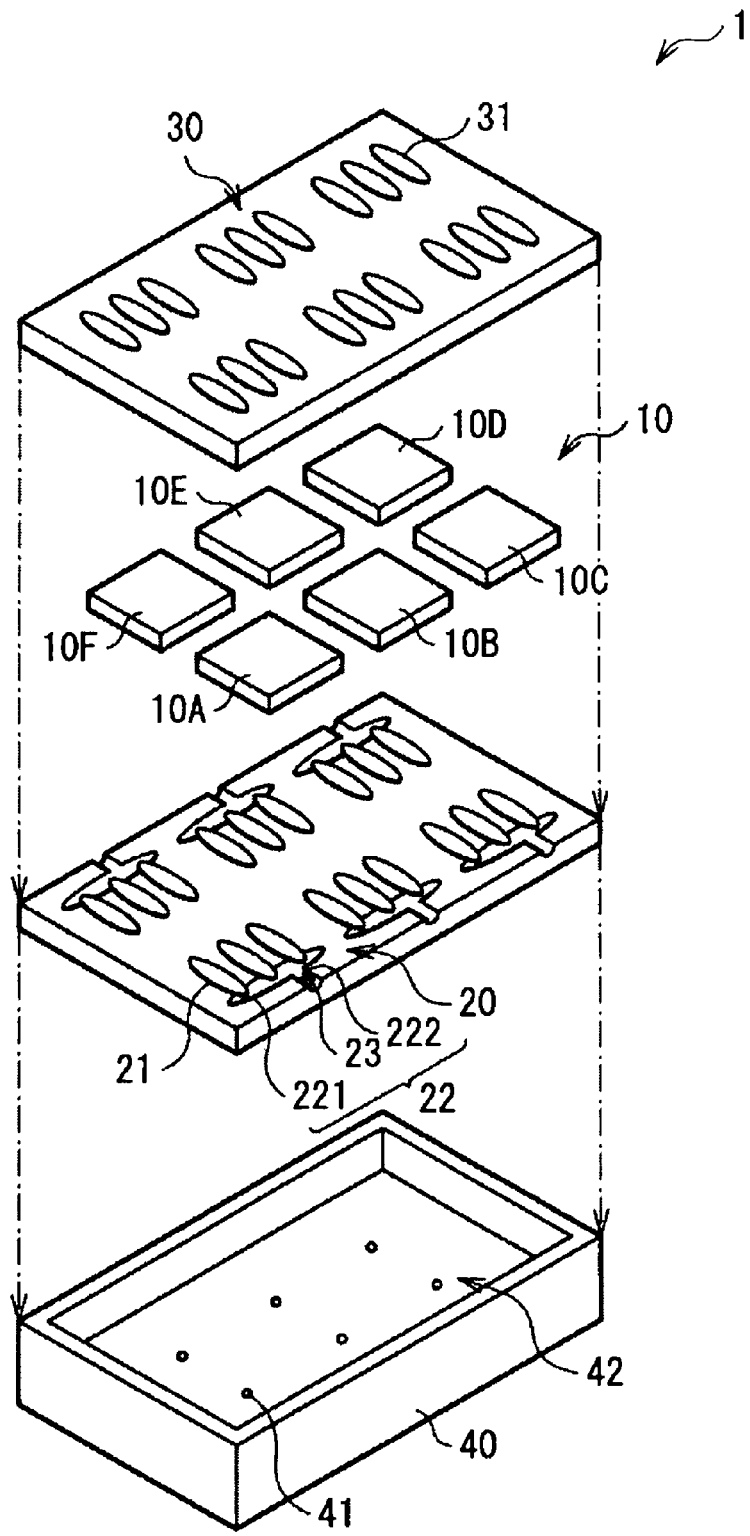
FIG. 2 is a perspective view illustrating an exploded structure of the fuel cell illustrated in FIG. 1.

FIG. 1 illustrates a cross sectional structure of a fuel cell according to a first embodiment of the invention. FIG. 2 illustrates an exploded view of the fuel cell illustrated in FIG. 1. The fuel cell 1 is used, for example, as a power source of a mobile electronic device such as a mobile phone and a notebook PC (Personal Computer). The fuel cell 1 includes an anode side platy member 20 and a cathode side platy member 30 on both sides of a power generation section 10.

The power generation section 10 is a Direct Methanol Fuel Cell for performing power generation by reaction between methanol and oxygen. The power generation section 10 includes one or a plurality of unit cells 10A to 10F (for example, 6 pieces in FIG. 2). The respective unit cells 10A to 10F have an electrolyte film 13 between a cathode electrode (oxygen electrode) 11 and an anode electrode (fuel electrode) 12. The unit cells 10A to 10F are arranged, for example, in a matrix of three by two in the in-plane direction, and has a plane laminated structure in which each thereof is electrically connected to each other in series by a connection member (not illustrated). A gap between each of the unit cells 10A to 10F is sealed with a seal material 14 made of a material having high alcohol resistance such as fluorine-contained rubber and PP (polypropylene).

The cathode electrode 11 and the anode electrode 12 have, for example, a structure in which a micro porous layer (MPL) and a catalyst layer containing a catalyst such as platinum (Pt) and ruthenium (Ru) are formed on a current collector such as carbon paper. The plane shape is, for example, a quadrangle. The catalyst layer is, for example, a layer in which a supporting body such as carbon black supporting a catalyst is dispersed in a polyperfluoroalkyl sulfonic acid proton conductive material or the like. According to needs, a gas diffusion layer (GDL) may be provided between the current collector and the micro porous layer (outside of the micro porous layer). An air supply pump (not illustrated) may be connected to the cathode electrode 11. Otherwise, the cathode electrode 11 may communicate with outside through an aperture (not illustrated) provided in a connection member (not illustrated), and air, that is, oxygen may be supplied therein by natural ventilation.

The electrolyte film 13 is made of, for example, a proton conductive material having a sulfonate group ($—SO_3H$). Examples of proton conductive materials include a polyperfluoroalkyl sulfonic acid proton conductive material (for example, "Nafion (registered trademark)," Du Pont make), a hydrocarbon system proton conductive material such as polyimide sulfone acid, and a fullerene system proton conducive material.

The anode side platy member 20 and the cathode side platy member 30 are respectively provided on the anode electrode 12 side and the cathode electrode 11 side of the power generation section 10. The anode side platy member 20 and the cathode side platy member 30 are, for example, made of an aluminum plate or a stainless steel plate being about 1 mm thick. Between the power generation section 10 and the cathode side platy member 30, a porous film 15 made of polyethylene or the like is provided to retain moisture. Between the power generation section 10 and the anode side platy member 20, for example, a gas-liquid separation film 16 made of a porous fluorine resin, polyester or the like is provided.

Outside of the anode side platy member 20, a fuel supply section 40 to which, for example, methanol as a fuel F is supplied is arranged. In the fuel supply section 40, a fuel supply hole 41 to which the fuel F is supplied from a fuel tank (not illustrated) is formed in a position corresponding to the respective unit cells 10A to 10F. Between the fuel supply section 40 and the anode side platy member 20, a fuel vaporization chamber 42 for vaporizing the fuel F is provided.

A gap G of the fuel vaporization chamber 42 is preferably, for example, 0.5 mm or more, since thereby the volume expansion when the fuel F is vaporized is able to be absorbed, and a space for uniformly diffusing the fuel F is able to be secured. If the gap G is excessively large, heat transmission amount from the power generation section 10 to the fuel supply section 40 is lowered, and vaporization of the fuel F is not able to be smoothly made. Thus, the gap G is preferably, for example, 3 mm or less.

Figure 3:
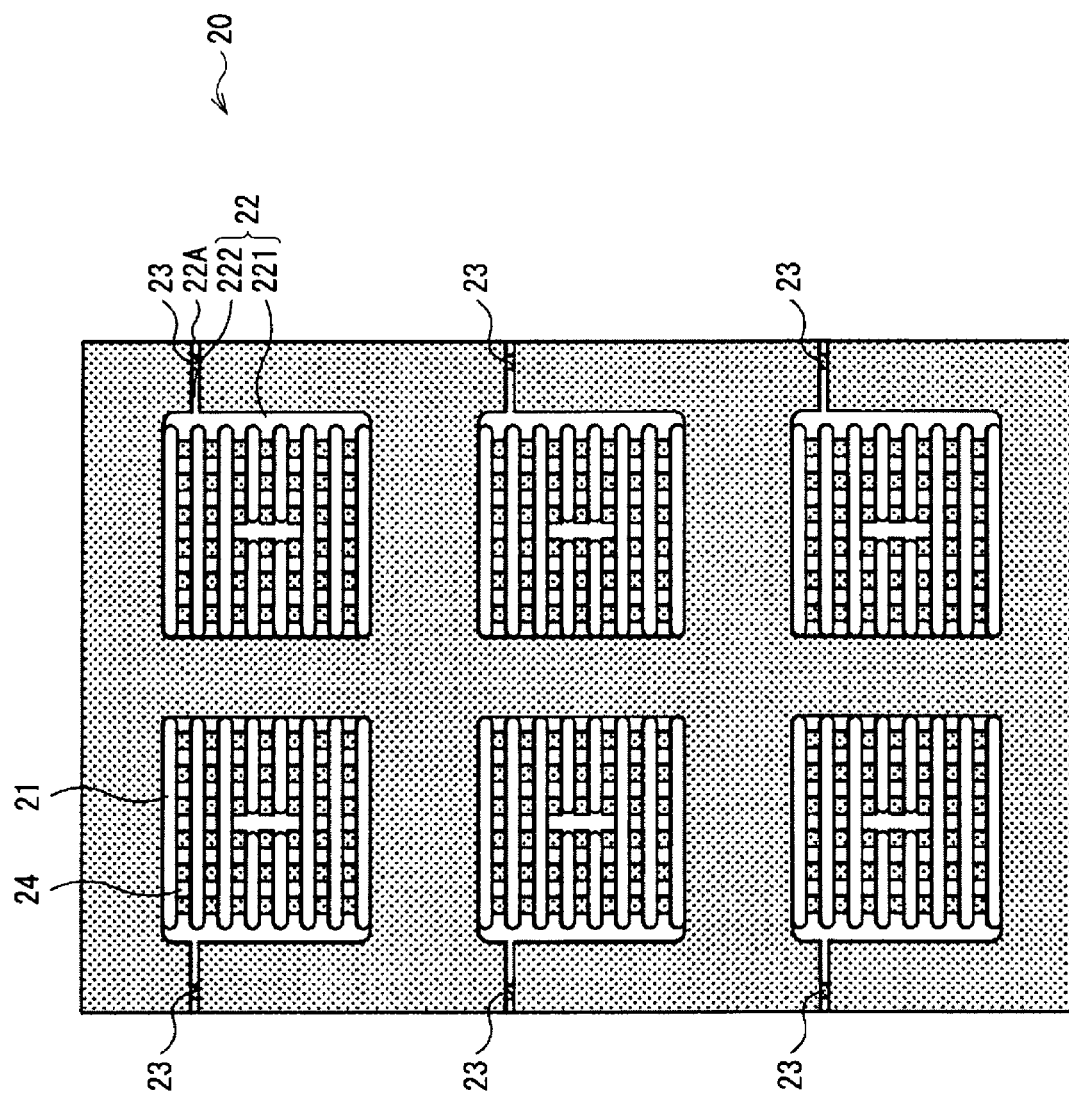
FIG. 3 is a plan view illustrating a structure of the anode side platy member illustrated in FIG. 1.
Figure 4:
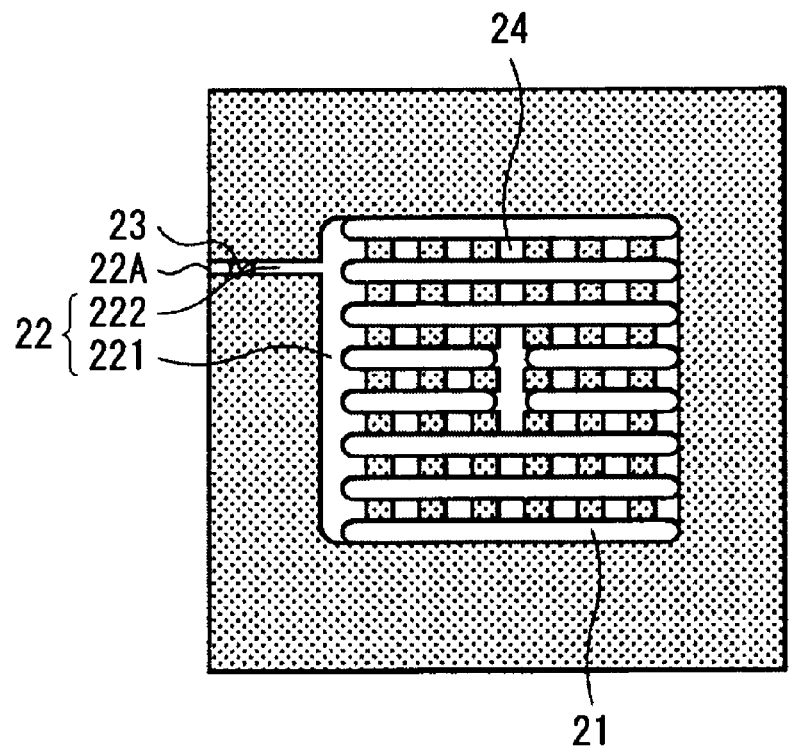
FIG. 4 is a plan view illustrating an enlarged part of the anode side platy member illustrated in FIG. 3.

FIG. 3 illustrates a planar structure viewed from the face opposed to the anode electrode 12 of the anode side platy member 20. FIG. 4 illustrates an enlarged part thereof. The anode side platy member 20 has a through hole 21 and a grove 22 in six rectangular regions corresponding to the anode electrode 12 of the respective unit cells 10A to 10F.

The through hole 21 is intended to flow the fuel F. The through hole 21 is arranged from the face opposed to the anode electrode 12 to the opposite face to communicate with the fuel vaporization chamber 42. The through hole 21 is arranged through the whole rectangular regions corresponding to the anode electrode 12. Thereby, the fuel F is able to be uniformly supplied to the anode electrode 12, and output is able to be improved. The aperture ratio of the through hole 21 to the area of the anode electrode 12 is desirably, for example, 30% or more, and more preferably 40% or more.

In the anode platy member 20, the groove 22 is provided as a carbon dioxide exhaust section for exhausting carbon dioxide generated in the anode electrode 12 at the time of power generation outside of the fuel cell 1. The groove 22 is formed on the face opposed to the anode electrode 12 of the anode side platy member 20 from inside of the region corresponding to the anode electrode 12 to an outlet 22A on a side face. While the groove 22 as the carbon dioxide exhaust section is provided on the face opposed to the anode electrode 12 of the anode side platy member 20 in this case, it is enough that the groove 22 gives passage between the anode electrode 12 and each side face of the anode platy member 20 or the fuel vaporization chamber 42. However, in view of exhaust efficiency of carbon dioxide and inhibiting exhaust of unused fuel, as in this embodiment, the groove 22 is preferably provided on the face opposed to the anode electrode 12 of the anode side platy member 20.

The groove 22 is composed of a first groove 221 and a second groove 222. The first groove 221 is provided in the region corresponding to the anode electrode 12 on the face opposed to the anode electrode 12. The second groove 222 is branched from the groove 221 and reaches the side face outlet 22A of the anode side platy member 20.

Figure 5:
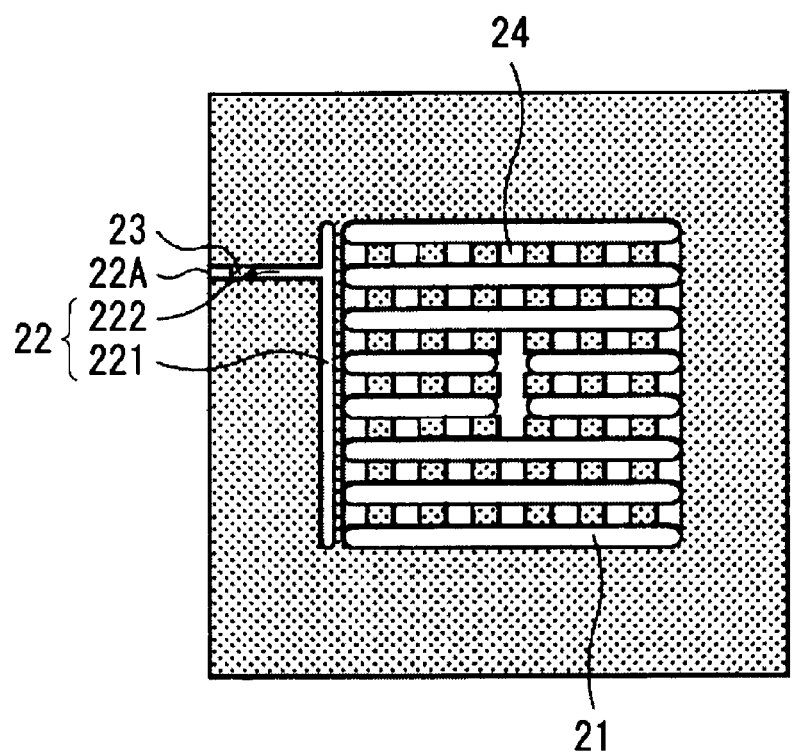
FIG. 5 is a plan view illustrating a modified example of FIG. 4.

As illustrated in FIG. 4, the first groove 221 may communicate with the through hole 21. Otherwise, as illustrated in FIG. 5, it is possible that the first groove 221 does not communicate with the through hole 21. In the case where the first groove 221 communicates with the through hole 21, generated carbon dioxide is exhausted through the through hole 21 to the first groove 221. Meanwhile, in the case where the first groove 221 does not communicate with the through hole 21, generated carbon dioxide is exhausted through the micro porous layer (MPL) or the gas diffusion layer (GDL) of the anode electrode 12 to the first groove 221. The first groove 221 desirably communicates with the through hole 21, since in such a case, it is free of influence of change of pressure loss due to water distribution in the micro porous layer (MPL) or the like. However, in the case where pressure loss is sufficiently low as a result of optimization of the micro porous layer (MPL) and the gas diffusion layer (GDL), it is not necessary that the first groove 221 communicates with the through hole 21.

The first groove 221 is preferably provided in a direction crossing the through hole 21. Specifically, the first groove 221 is preferably provided along a side of the rectangular region corresponding to the anode electrode 12, and the through hole 21 is preferably provided in a direction perpendicular to the first groove 221. Thereby, it is possible to generate flow of the vaporized fuel F and generated carbon dioxide to the side along which the first groove 221 is provided from the opposite side, and the carbon dioxide is more effectively removed. Meanwhile, in this case, the fuel F is able to be supplied to the anode electrode 12.

The first groove 221 and the second groove 222 are sealed with the anode electrode 12 and the seal material 14, and is open to the air at the outlet 22A. The cross sectional area of the second groove 222 is preferably smaller than the cross sectional area of the first groove 221 in order to provide pressure loss in the vicinity of the outlet 22A. Thereby, the flow rate in the first groove 221 is able to be inhibited, reaction time on the surface of the anode electrode 12 is able to be gained, and exhaust of unreacted fuel F to outside of the system is able to be more inhibited. Further, in this case, in the case where the power generation section 10 is composed of the plurality of unit cells 10A to 10F, pressure loss in the respective unit cells 10A to 10F is able to be uniformized, and fuel supply to the respective unit cells 10A to 10F is able to be performed uniformly.

Figure 6A:
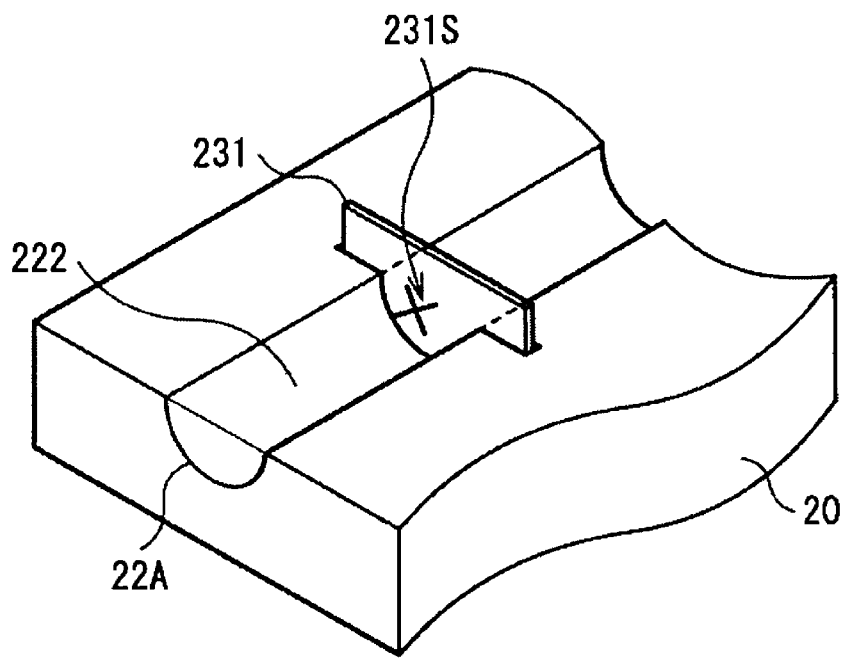
FIGS. 6A and 6B are perspective views illustrating a shape of a valve.
Figure 6B:
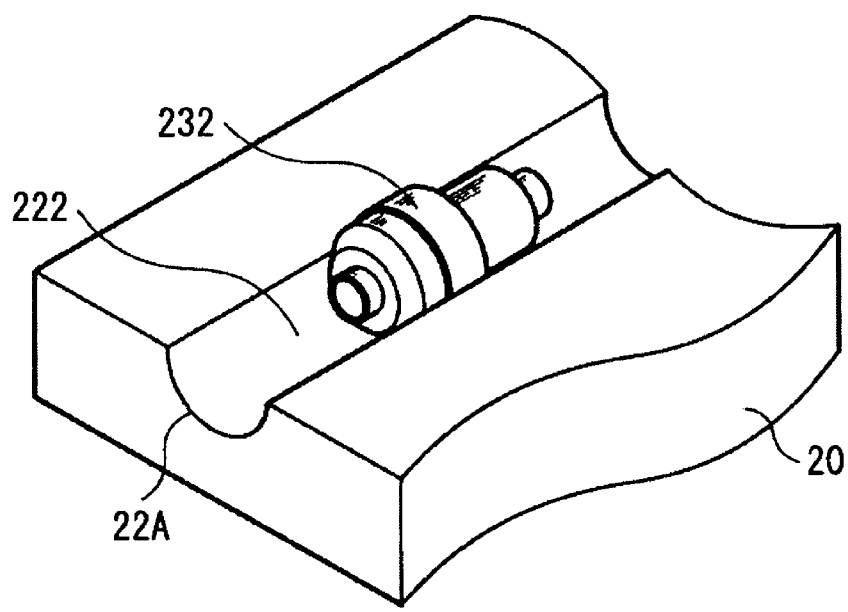

In the groove 22, a valve 23 to adjust the inner pressure of the fuel vaporization chamber 42 and inhibit intrusion of external air from outside at the time of stopping power generation is provided. The position of the valve 23 is not particularly limited. However, deterioration of the anode electrode 12 due to intrusion of external air may result from, for example, elution of a catalyst generated by combustion reaction between vaporized fuel and oxygen contained in external air. Thus, since the anode electrode 12 is preferably not contacted with external air, the valve 23 is preferably provided in the second groove 222, and in particular, is preferably provided in the vicinity of the outlet 22A. Further, for example, as illustrated in FIGS. 6A and 6B, the valve 23 may be composed of a pressure adjustment valve 231 (FIG. 6A) made of a material having flexibility such as rubber, a check valve 232 (FIG. 6B) or the like. The valve 23 is intended to inhibit intrusion of external air. That is, it is enough that the pressure adjustment valve 231 is a valve in which a slit 231A is not opened by a pressure lower than air pressure, and it is enough that the check valve 232 is a valve that prevents intrusion of external air and is opened by an appropriate pressure inside the cell. Therefore, in view of manufacturing easiness and cost, the pressure adjustment valve 231 is preferably used. Meanwhile, in view of shutting external air, the check valve 232 is preferably used.

Further, the anode side platy member 20 preferably has an auxiliary groove 24 giving passage between each through hole 21 on the face opposed to the anode electrode 12. Thereby, vaporized fuel F is able to be diffused and supplied onto the anode electrode 12 more widely, and is able to more effectively initiate electrochemical reaction.

In the anode side platy member 20, a section where the through hole 21, the groove 22 and the auxiliary groove 24 are not formed is preferably left at a certain ratio or more (for example, about from 20% to 40% both inclusive out of the area of the anode electrode 12). Further, apertures such as the through hole 21, the groove 22 and the auxiliary groove 24 are preferably arranged being uniformly dispersed (no single substantial aperture is not provided, that is, the maximum dimension of the apertures is one fifth or less of the dimension of the anode electrode 12). Thereby, it is possible that the contact area between the anode side platy member 20 and the anode electrode 12 becomes large, and compression force by the anode side platy member 20 against the power generation section 10 is able to be uniformly secured. Thus, it is possible to inhibit increase of interface resistance between the cathode electrode 11 or the anode electrode 12 and the electrolyte film 13, interface resistance between the gas diffusion layer (GDL) and the micro porous layer (MPL) in the cathode electrode 11 or the anode electrode 12, and interface resistance between the micro porous layer (MPL) (not illustrated) and a catalyst layer (not illustrated).

Figure 7:
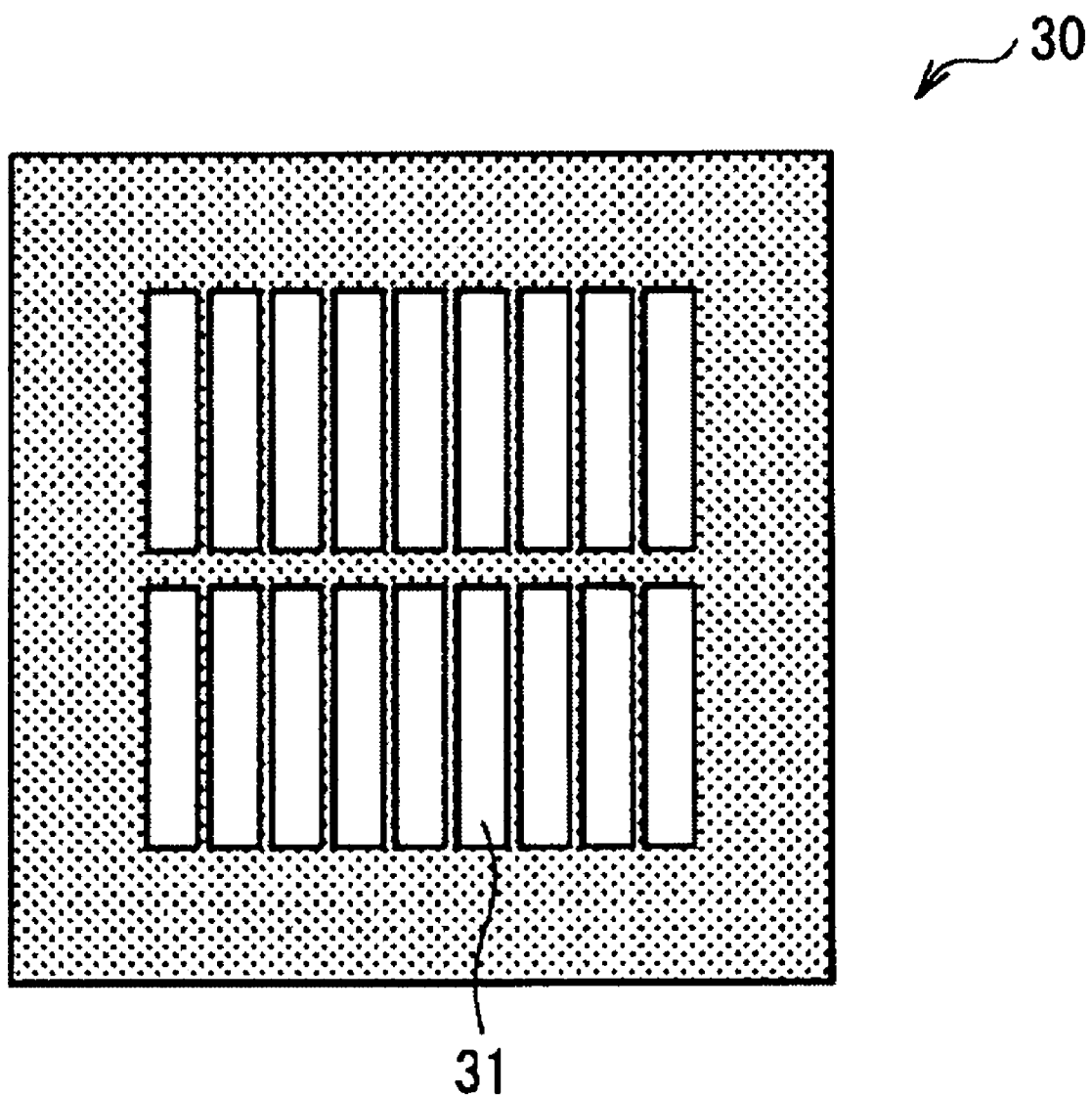
FIG. 7 is a plan view illustrating a structure of the cathode side platy member illustrated in FIG. 1.

The cathode side platy member 30 has a through hole 31 that penetrates from the face opposed to the cathode electrode 11 to the opposite face for passing air (oxygen) as an oxidant. FIG. 7 illustrates a structure of the cathode side platy member 30 viewed from the face opposed to the cathode electrode 11. The through hole 31 is provided in a region corresponding to the cathode electrode 11, and is, for example, in the shape of many parallel long holes (slits). However, the shape thereof is not limited thereto. FIG. 7 illustrates one of six rectangular regions corresponding to the cathode electrode 11 out of the cathode side platy member 30.

The fuel cell 1 is able to be manufactured, for example, as follows.

Method of Manufacturing the Fuel Cell

First, the electrolyte film 13 made of the foregoing material is sandwiched between the cathode electrode 11 and the anode electrode 12 made of the foregoing material. The resultant is jointed by thermal compression bond to form the unit cells 10A to 10F.

Next, the six unit cells 10A to 10F are arranged in a matrix of three by two, and are electrically connected to each other in series by the connection member (not illustrated). The seal member (not illustrated) made of the foregoing material is provided around the electrolyte film 13, and the seal member is screwed and fixed on a connection member 101.

Subsequently, the anode side platy member 20 and the cathode side platy member 30 made of the foregoing material are prepared. For example, by processing with the use of an end mill or the like, the through hole 31 is formed in the cathode side platy member 30, and the through hole 21, the first groove 221, the second groove 222, and the auxiliary groove 24 are formed in the anode side platy member 20. In the case of mass production, etching and diffusion bonding, injection molding or the like ma be used.

Next, a valve is arranged in a given position of the second groove 222 of the anode side platy member 20.

After that, the cathode side platy member 30 is arranged on the cathode electrode 11 side of the linked unit cells 10A to 10F, and the anode side platy member 20 and the fuel supply section 40 are arranged on the anode electrode 12 side of the linked unit cells 10A to 10F. Accordingly, the fuel cell 1 illustrated in FIG. 1 and FIG. 2 is completed.

In the fuel cell 1, the fuel F is supplied through the through hole 21 of the anode side platy member 20 to the anode electrode 12 of the respective unit cells 10 10A to 10F, and reaction is initiated to generate protons and electrons. The protons are moved through the electrolyte film 13 to the cathode electrode 11, are reacted with electrons and oxygen to generate water. Thereby, part of chemical energy of the fuel F, that is, methanol is converted to electric energy, which is extracted as an output current from the power generation section 10. Electro motive force by the output current and the power generation section 10 is supplied to an external load (not illustrated), and the load is driven.

In this case, the groove 22 composed of the first groove 221 and the second groove 222 is provided on the face opposed to the anode electrode 12 of the anode side platy member 20. The first groove 221 is formed in the region corresponding to the anode electrode 12. The second groove 222 is branched from the first groove 221 and reaches the side face outlet 22A. Thus, carbon dioxide generated by electrochemical reaction of the fuel F is exhausted through the first groove 221 and the second groove 222. Thus, increase of carbon dioxide concentration in the vicinity of the anode electrode 12 and increase of inner pressure are avoided, and improvement of output and power generation efficiency is enabled. Further, since the groove 22 does not penetrate through the anode side platy member 20, the unused fuel F in the groove 22 always passes through over the anode electrode 12. Therefore, the fuel is sufficiently consumed, and unreacted fuel is inhibited from passing through the groove 22 and being exhausted outside of the system.

Further, the valve 23 is provided in the groove 22, in particular in the second groove 222. Thus, carbon dioxide generated at the time of power generation is exhausted, and thereby the inner pressure of the fuel vaporization chamber 42 is decreased. Further, air intrusion due to a fact that the pressure in the fuel vaporization chamber 42 becomes a negative pressure after stopping power generation is able to be inhibited.

Accordingly, in this embodiment, the groove 22 composed of the first groove 221 and the second groove 222 is provided on the face opposed to the anode electrode 12 of the anode side platy member 20. The first groove 221 is formed in the region corresponding to the anode electrode 12. The second groove 222 is branched from the first groove 221 and reaches the side face outlet 22A. Thus, carbon dioxide generated by electrochemical reaction of the fuel F is exhausted through the first groove 221 and the second groove 222. Thus, increase of carbon dioxide concentration in the vicinity of the anode electrode 12 and increase of inner pressure are avoided, and improvement of output and power generation efficiency is enabled. Further, since the groove 22 does not penetrate through the anode side platy member 20, the unused fuel F in the groove 22 always passes through over the anode electrode 12. Therefore, since carbon dioxide is removed through the first groove 221 and the second groove 222, and the unused fuel F in the groove 22 always passes through over the anode electrode 12, unreacted fuel is inhibited from being exhausted outside of the system, and output is able to be improved.

Further, the valve 23 is provided in the groove 22, in particular in the second groove 222. Thus, carbon dioxide generated at the time of power generation is exhausted, and thereby the inner pressure of the fuel vaporization chamber 42 is decreased. Further, air intrusion due to a fact that the pressure in the fuel vaporization chamber 42 becomes a negative pressure after stopping power generation is able to be inhibited. Thereby, when the fuel cell 1 is restarted, deterioration of the anode electrode due to elution of a catalyst such as Ru generated by combustion reaction between oxygen contained in intruding external air and vaporized fuel is able to be inhibited, and voltage lowering generated in the power generation section is able to be inhibited.

Further, compared to the existing technology such as containing a fuel cell body into a sealing container, the number of parts is inhibited from being increased. Thus, outside air intrusion into the fuel vaporization chamber 42 after stopping power generation is able to be inhibited simply and inexpensively. Further, since the valve 23 to inhibit external air intrusion into the fuel cell is provided, the device is able to be avoided from being enlarged.

SECOND EMBODIMENT

Whole Structure of a Fuel Cell System

Figure 8:
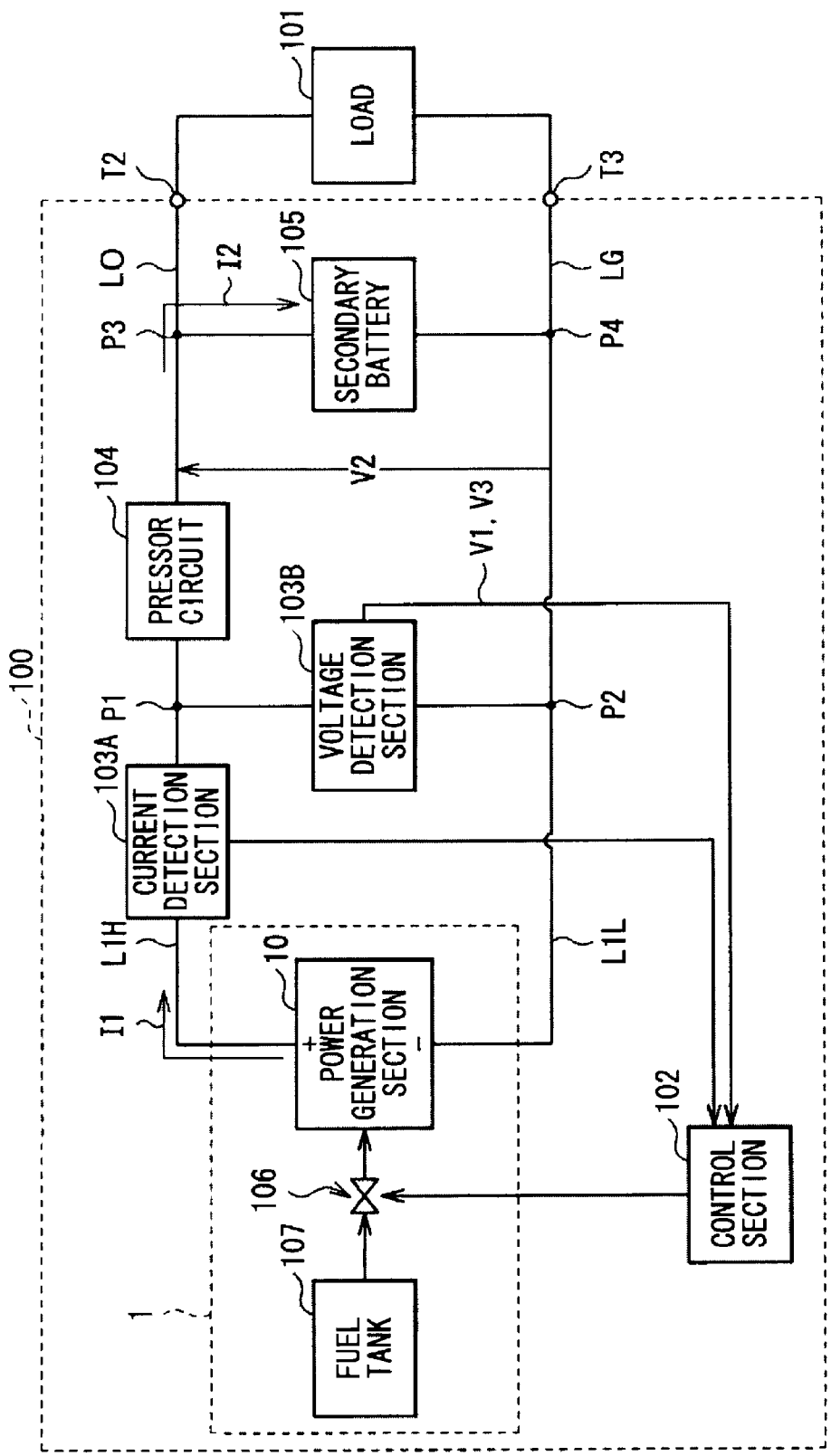
FIG. 8 is a functional block diagram illustrating a whole structure of a fuel cell system according to a second embodiment of the invention.

FIG. 8 illustrates a whole structure of a fuel cell system (fuel cell system 100) according to a second embodiment of the invention. The fuel cell system 100 drives a load 101 by power generation of the fuel cell 1 described in the foregoing first embodiment, or charges a secondary battery 105. The fuel cell system 100 is composed of, for example, the fuel cell 1, a current detection section 103A, a voltage detection section 103B, a pressor circuit 104, the secondary battery 105, and a control section 102. For the sections overlapped with the sections in the first embodiment, the description thereof will be omitted.

The fuel cell 1 includes the power generation section 10, a fuel pump 106, and a fuel tank 107. The fuel tank 107 stores a liquid fuel necessary for power generation (for example, methanol or methanol water solution). The fuel pump 106 pumps up the liquid fuel stored in the fuel tank 107, supplies (transports) the liquid fuel to the power generation section 10 side, and is composed of a piezoelectric body or the like. Operation (supply operation of the liquid fuel) of the fuel pump 106 is controlled by the after-mentioned control section 102.

The current detection section 103A is arranged between the cathode electrode side of the power generation section 1 and a connection point P1 on a connection line L1H and is intended to detect a power generation current I1 of the power generation section 1. The current detection section 103A includes, for example, a resistor. The current detection section 103A may be arranged on a connection line L1L (between the anode electrode side of the power generation section 10 and a connection point P2).

The voltage detection section 103B is arranged between the connection point P1 on the connection line L1H and the connection point P2 on the connection line L1L. The voltage detection section 103B is intended to detect a voltage generated from the power generation section 10 (a power generation voltage V1 generated at the time of power generation and a voltage V3 generated at the time of stopping power generation), and includes, for example, a resistor.

The pressor circuit 104 is arranged between the connection line L1H and a connection point P3 on an output line LO. The pressor circuit 104 is a voltage converter that increases the power generation voltage V1 (direct current voltage) of the power generation section 10 and generates a direct current voltage V2. The pressor circuit 104 is composed of, for example, a DC/DC converter.

The secondary battery 105 is arranged between the connection point P3 on the output line LO and a connection point P4 on a ground line LG (connection line L1L). The secondary battery 105 is intended to perform electric storage based on the direct current voltage V2 generated by the pressor circuit 104. The secondary battery 105 is composed of, for example, a lithium ion battery or the like.

The control section 102 is intended to drive the fuel pump 106 to supply the liquid fuel to the power generation section 10. In this embodiment, based on control by the control section 102, the liquid fuel is supplied not only at the time of power generation but also at the time of stopping power generation. Fuel supply timing at the time of stopping power generation is set based on the voltage V3. The control section 102 is composed of, for example, a micro computer or the like. For the detailed operation of the control section 102, a description will be given later.

Operation of the Fuel Cell System
Operation at the Time of Power Generation

In the fuel cell system 100, at the time of power generation, the liquid fuel F stored in the fuel tank 107 is pumped up by the fuel pump 106 and is supplied to the fuel cell 1. In the fuel cell 1, when the liquid fuel F reaches the fuel vaporization chamber 42 through the fuel supply hole 41, the liquid fuel F is naturally vaporized in the fuel vaporization chamber 42. The vaporized fuel sequentially passes through the through hole 21 of the anode side platy member 20 and the gas-liquid separation film 16, and is supplied to the anode electrode 12 side of the power generation section 10.

Figure 9:
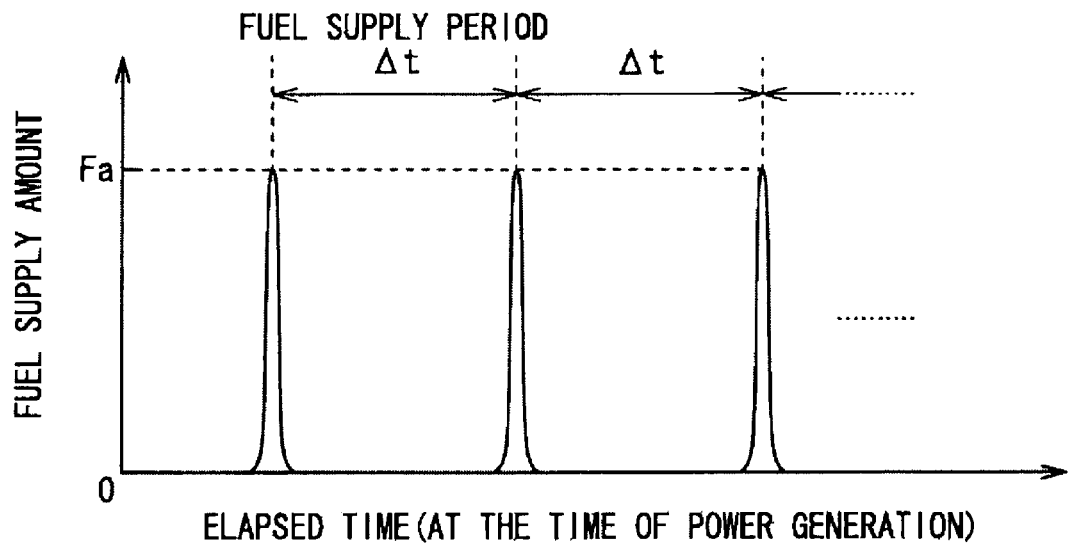
FIG. 9 is a conceptual diagram for explaining a fuel supply at the time of power generation.

The fuel pump 106 intermittently supplies the liquid fuel F to the fuel cell 1 based on the control by the control section 102. That is, as illustrated in FIG. 9, the fuel pump 106 supplies a fuel supply amount Fa of the liquid fuel F to the fuel cell 1 at the time according to a fuel supply period $\Delta t$. The fuel supply amount Fa is adjusted as appropriate according to the fuel supply period $\Delta t$, the inner product of the fuel vaporization chamber 42 and the like.

Meanwhile, part of chemical energy of the liquid fuel F, that is, methanol is converted to electric energy, which is collected by the connection member (not illustrated), and then is extracted as a current (power generation current I1) from the power generation section 10. The power generation voltage V1 based on the power generation current I1 is increased by the pressor circuit 104 (voltage conversion), and becomes the current voltage V2. The current voltage V2 is supplied to the secondary battery 105 or the load (for example, electronic device body) 101. Thereby, charging the secondary battery 105 or driving the load 101 is performed.

In this case, carbon dioxide generated by power generation is exhausted outside through the groove 22 provided in the anode side platy member 20. Thus, increase of carbon dioxide concentration in the vicinity of the anode electrode 12 and increase of inner pressure are avoided, and improvement of output and power generation efficiency is enabled. Further, as described in the first embodiment, since the valve 23 is provided in the groove 22, intrusion of external air through the groove 22 at the time of stopping power generation is inhibited.

However, the valve 23, for example, the pressure adjustment valve 231 does not perfectly block intrusion of external air. Thus, since oxygen partial pressure is increased in the region on the anode electrode 12 side (in this case, the fuel vaporization chamber 42 and the through hole 21 of the anode side platy member 20), it is difficult to perfectly inhibit deterioration of the anode electrode 12. Therefore, to more effectively inhibit deterioration of the anode electrode 12, in this embodiment, the following fuel supply operation is performed in a state of stopping power generation.

Operation at the Time of Stopping Power Generation

In a state of stopping power generation, in the fuel cell system 100, the voltage detection section 103B detects the voltage (voltage V3) generated in the power generation section 10, and the fuel pump 106 supplies a given amount of the liquid fuel F to the fuel cell 1 based on the voltage V3.

Figure 10:
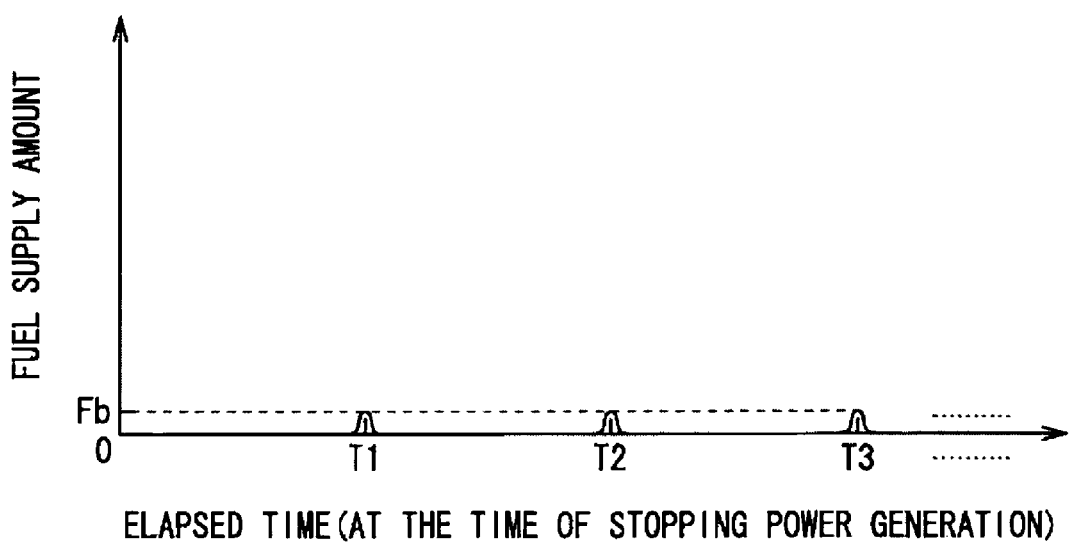
FIG. 10 is a conceptual diagram for explaining a fuel supply at the time of stopping power generation.

Specifically, every time when the voltage V3 becomes a given voltage value or less, the fuel pump 106 supplies the liquid fuel F to the fuel cell 1. For example, as illustrated in FIG. 10, every timing T1, T2, T3, or the like when the voltage V3 becomes the given voltage value or less, the fuel pump 106 supplies a fuel supply amount Fb of the liquid fuel F to the fuel cell 1. The fuel supply amount Fb is a significantly slight amount compared to the fuel supply amount Fa at the time of power generation, and is set as appropriate according to the diameter and the length of the groove 22.

In the fuel cell 1, if the fuel supply amount Fb of the liquid fuel F is supplied as described above, the liquid fuel F reaches the fuel vaporization chamber 42 through the fuel supply hole 41 and is vaporized. The internal pressure is increased by the vaporized fuel gas, oxygen pooled on the anode electrode 12 side is exhausted outside through the groove 22. Thereby, the oxygen partial pressure on the anode electrode 12 side is lowered (the voltage V3 is increased).

As described above, the anode electrode 12 is deteriorated by increasing the oxygen partial pressure. There is a close relation between the oxygen partial pressure and the voltage V3. That is, there is a relation that as the oxygen partial pressure is increased (decreased), the voltage is decreased (increased).

Thus, a voltage value (threshold value) is previously set so that the oxygen partial pressure does not become a certain value or more, and the liquid fuel F is supplied in the case where the detected voltage V3 becomes such a voltage value or less. Thereby, the oxygen partial pressure is inhibited from being increased.

Further, in the case where the oxygen partial pressure that has been once decreased is increased again (the voltage V3 is decreased) as the stopping time advances, the foregoing fuel supply operation is repeated. Thus, the oxygen partial pressure is inhibited from becoming the certain value or more. For example, in the case where the stopping time is long, it is enough that every time when the voltage V3 becomes the given voltage value or less, the liquid fuel F is repeatedly supplied.

As described above, in this embodiment, in a state of stopping power generation, the voltage V3 generated in the power generation section 10 is detected, and every time when the voltage V3 becomes the given voltage value or less, the fuel pump 106 supplies the liquid fuel F to the anode electrode 12 side of the fuel cell 1. Thus, by combining arrangement of the valve 23 into the groove 22 with the fuel cell system of supplying the liquid fuel F to the anode electrode 12 side based on the value of the voltage V3 generated in the power generation section 10 at the time of stopping power generation, intrusion of external air at the time of stopping power generation is able to be more effectively inhibited. Thereby, deterioration of the anode electrode 12 is further inhibited compared to in the first embodiment. In addition, by supplying the fuel at the time of stopping power generation, drying the anode electrode 12 and the electrolyte 13 is inhibited. Such a fact may contribute to inhibiting deterioration.

Further, a description will be given of a specific example with the use of the fuel cell 1 of the invention.

Example

In this example, the fuel cell 1 in which a rubber sheet with a cross-shape cut line as the valve 23 was attached to the outlet 22A on a side face of the anode side platy member 20 was fabricated. As Comparative example 1 to the example, a fuel cell in which the carbon dioxide exhaust was opened was used to measure the voltage V3 when one hour elapsed after stopping power generation. The result is shown in Table 1.

TABLE 1

| | EXAMPLE | COMPARATIVE EXAMPLE 1 ($CO_2$ EXHAUST IS OPENED) |
|---|---|---|
| VOLTAGE | 0.66 V | 0.11 V |

That is, it was found that by providing the valve 23 in the groove 22, intrusion of external air due to lowering of the inner pressure of the fuel vaporization chamber 42 at the time of stopping power generation was inhibited, and lowering the voltage V3 generated in the power generation section 10 was able to be inhibited.

Figure 11:
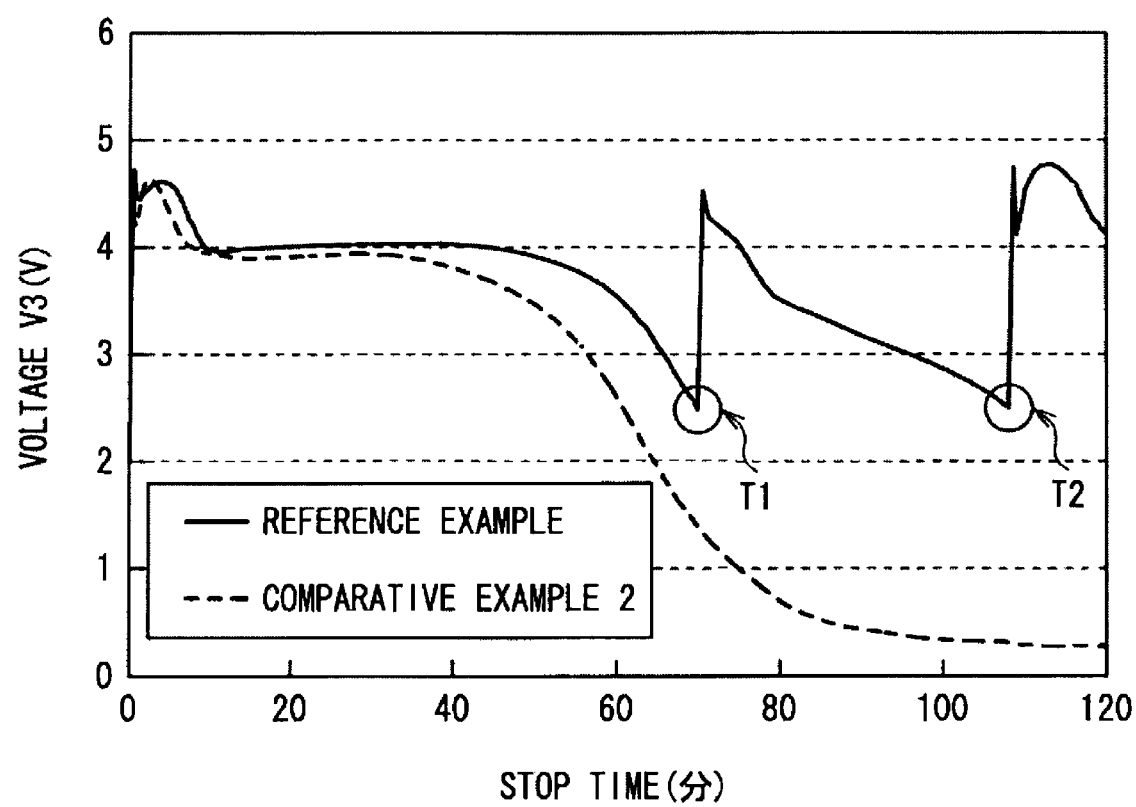
FIG. 11 is a characteristics diagram illustrating voltage change at the time of stopping power generation according to a reference example and a comparative example.

Next, a description will be given of the effect obtained by preparing the foregoing fuel cell system 100 as a reference example. In this reference example, when the voltage V3 became 2.5 V (0.4 V per unit cell) or less at the time of stopping power generation, the liquid fuel F was supplied to the fuel cell 1 in which six unit cells were connected to each other in series. The fuel supply amount Fb was 10 μl. FIG. 11 illustrates change of the voltage V3 to stop time and fuel supply timings (T1 and T2) at this time. FIG. 11 also illustrates a case that the fuel was not supplied at the time of stopping power generation as Comparative example 2 to the reference example. To clarify the effect of supplying the fuel, the valve 23 was not provided in this case.

As illustrated in FIG. 11, when power generation was stopped, the voltage V3 started to be gradually decreased (oxygen partial pressure was increased). In the comparative example in which the fuel was not supplied, as stop time elapsed, the voltage V3 continued to be decreased, that is, the oxygen partial pressure continued to be increased, which resulted in deterioration of the power generation section 10. Meanwhile, in this example, since 10 μl of the liquid fuel F was supplied to the fuel cell 1 at the time when the voltage V3 reached 2.5 V when about 70 minutes elapsed (T1), the voltage V3 was instantly increased up close to the initial voltage (oxygen partial pressure was decreased). After that, as stop time elapsed, the voltage V3 started to be decreased again. Then, at the time when the voltage V3 reached 2.5 V (T2), the voltage V3 was increased up close to the initial voltage by supplying the fuel similarly to the foregoing. As described above, it is enough that the voltage V3 at the time of stopping power generation was detected, and the liquid fuel F was supplied every time when the voltage became a given voltage value or less (in this case, 2.5 V ore less), and thereby increase of the oxygen partial pressure was able to be inhibited. Further, when the deterioration ratio after 76 cycles in total was measured under the conditions that start and stop was regarded as one cycle, the result was 17% in the reference example, and 33% in Comparative example 2. In this case, the deterioration ratio (%) was calculated from the following Formula 1. As an initial output, the output after 5 cycles when the output became stable was used.

Deterioration ratio={1−(output after 76 cycles/initial output)}*100  Formula 1

From the foregoing result, it is presumed that in the fuel cell 1, by combining provision of the valve 23 into the groove 22 with the system having the control section for controlling fuel supply described above, intrusion of external air at the time of stopping power generation is more effectively inhibited.

Modified Examples

Figure 12:
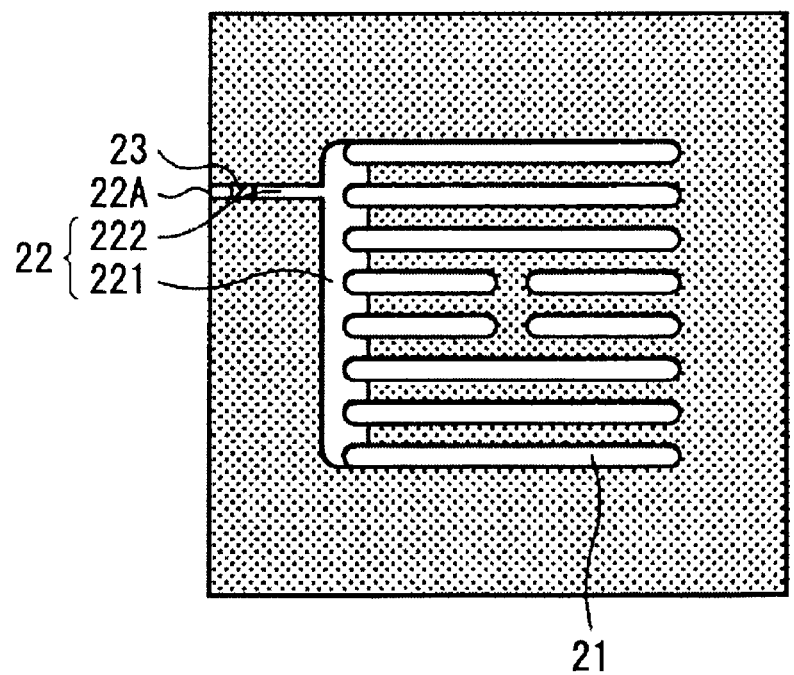
FIG. 12 is a plan view illustrating another modified example of FIG. 5.

In the foregoing embodiment, the description has been given of the case that the anode side platy member 20 has the auxiliary groove 24 for giving passage between each through hole 21 on the face opposed to the anode electrode 12. However, the structure is not limited thereto. For example, as illustrated in FIG. 12, it is possible that the auxiliary groove 24 is not provided, but only the though hole 21 and the groove 22 are provided.

Figure 13:
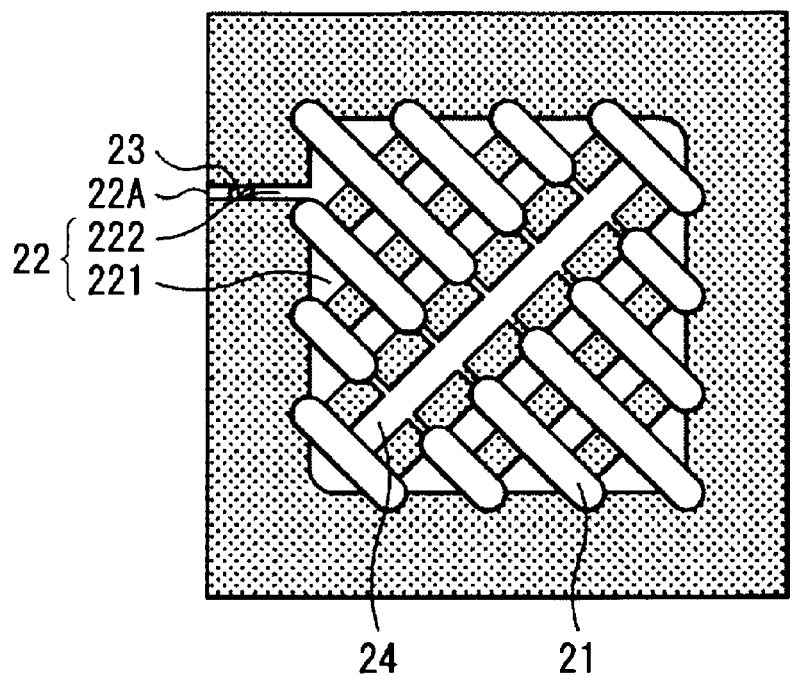
FIG. 13 is a plan view illustrating still another modified example of FIG. 5.

Further, the though hole 21 and the auxiliary groove 24 are not necessarily all formed in the same direction in the rectangular region corresponding to the anode electrode 12, but the though hole 21 may be formed in a diagonal direction as illustrated in FIG. 13. As in the case of FIG. 13, the auxiliary groove 24 is formed perpendicular to the though hole 21, the groove 22 is formed to surround the rectangular region corresponding to the anode electrode 12. While FIG. 13 illustrates the case that the groove 22 communicates with the through hole 21 and the auxiliary groove 24, the groove 22 does not necessarily communicate with the through hole 21 and the auxiliary groove 24.

Figure 14:
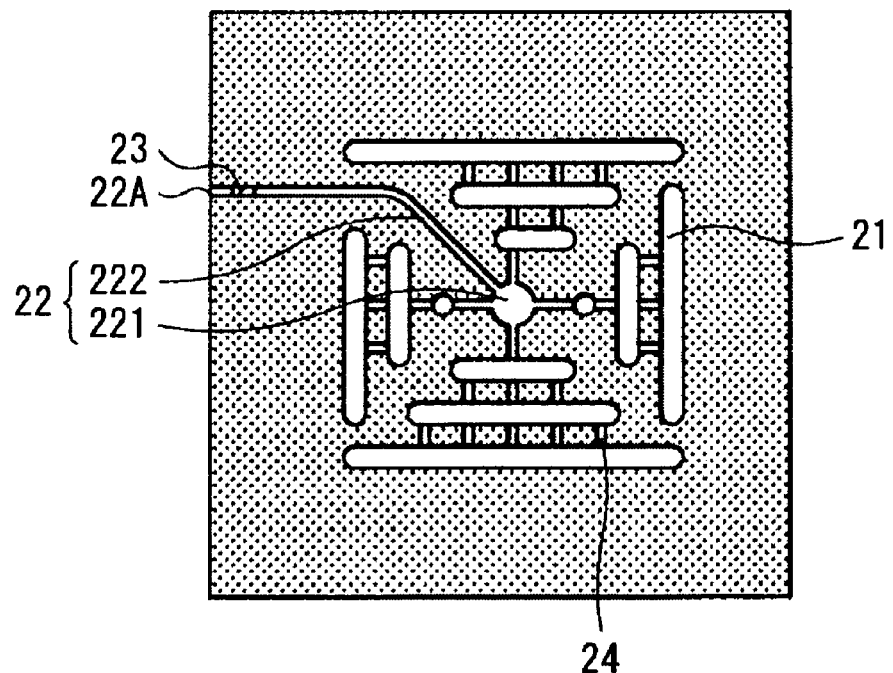
FIG. 14 is a plan view illustrating still another modified example of FIG. 5.

Further, as illustrated in FIG. 14, the though hole 21 and the auxiliary groove 24 may be radially arranged to surround a center 221A of the rectangular region corresponding to the anode electrode 12. In this case, the though hole 21 and the auxiliary groove 24 desirably cross each other or are perpendicular to each other in a section where the though hole 21 and the auxiliary groove 24 communicate with each other. Thus, the auxiliary groove 24 may be partially a curved line, or may be bent. Further, in the case that the though hole 21 and the auxiliary groove 24 are radially arranged, the second groove 222 is desirably formed so that the center 221A of the rectangular region corresponding to the anode electrode 12 communicates with the side face outlet 22A. Further, the auxiliary groove 24 may communicate with the first groove 221.

Figure 15:
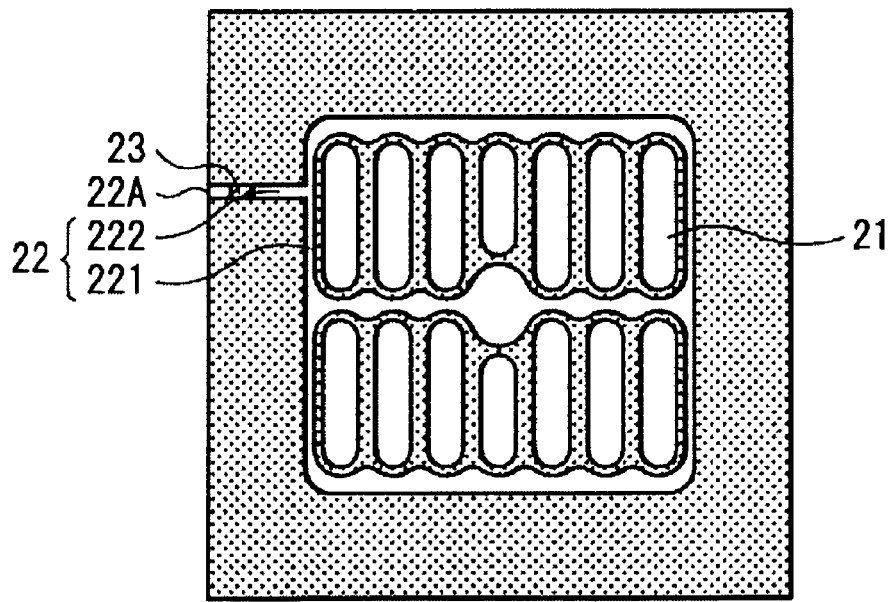
FIG. 15 is a plan view illustrating still another modified example of FIG. 5.
Figure 16:
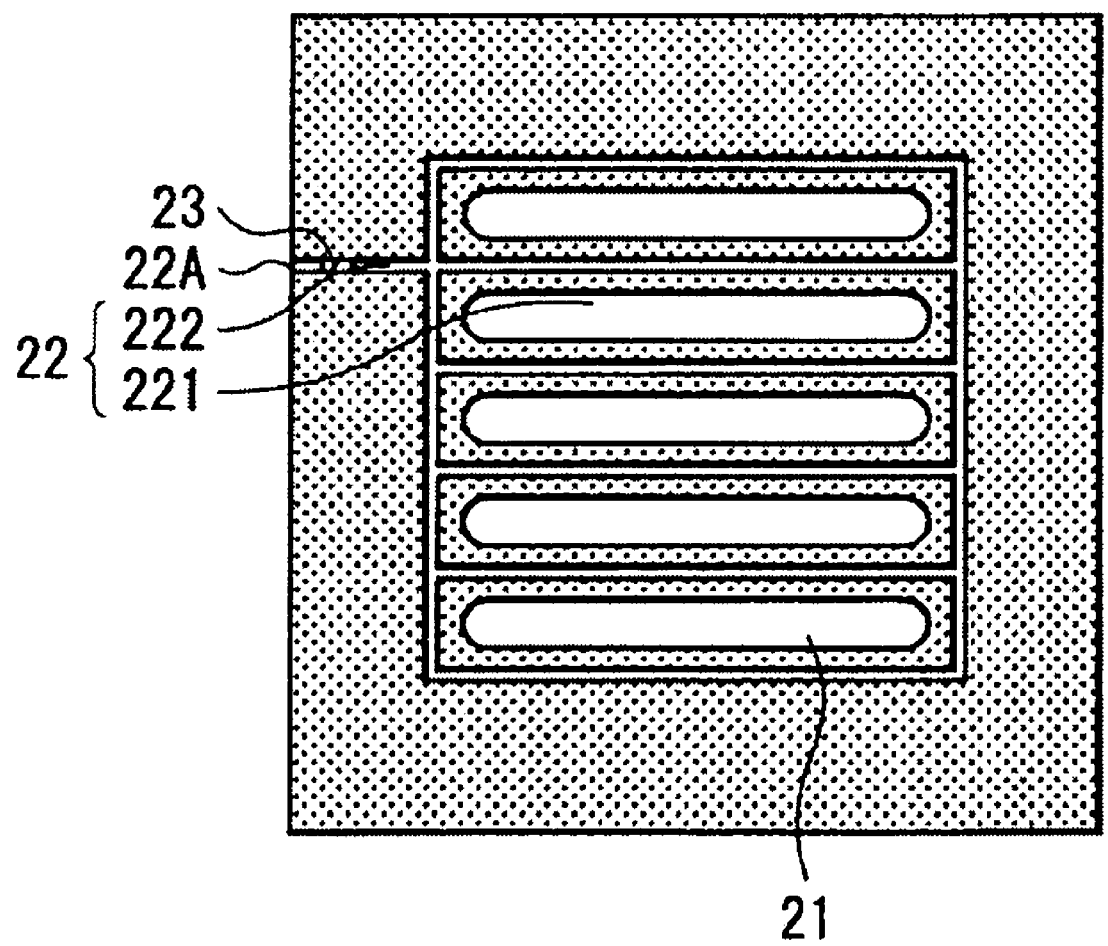
FIG. 16 is a plan view illustrating still another modified example of FIG. 5.

In addition, the groove 22 is not necessarily provided only on one side of the rectangular region corresponding to the anode electrode 12. For example, as illustrated in FIG. 15, the groove 22 may be provided to surround the plurality of through holes 21. Otherwise, as illustrated in FIG. 16, the groove 22 may be provided around the through hole 21 and between each through hole 21.

Application Example

Figure 17:
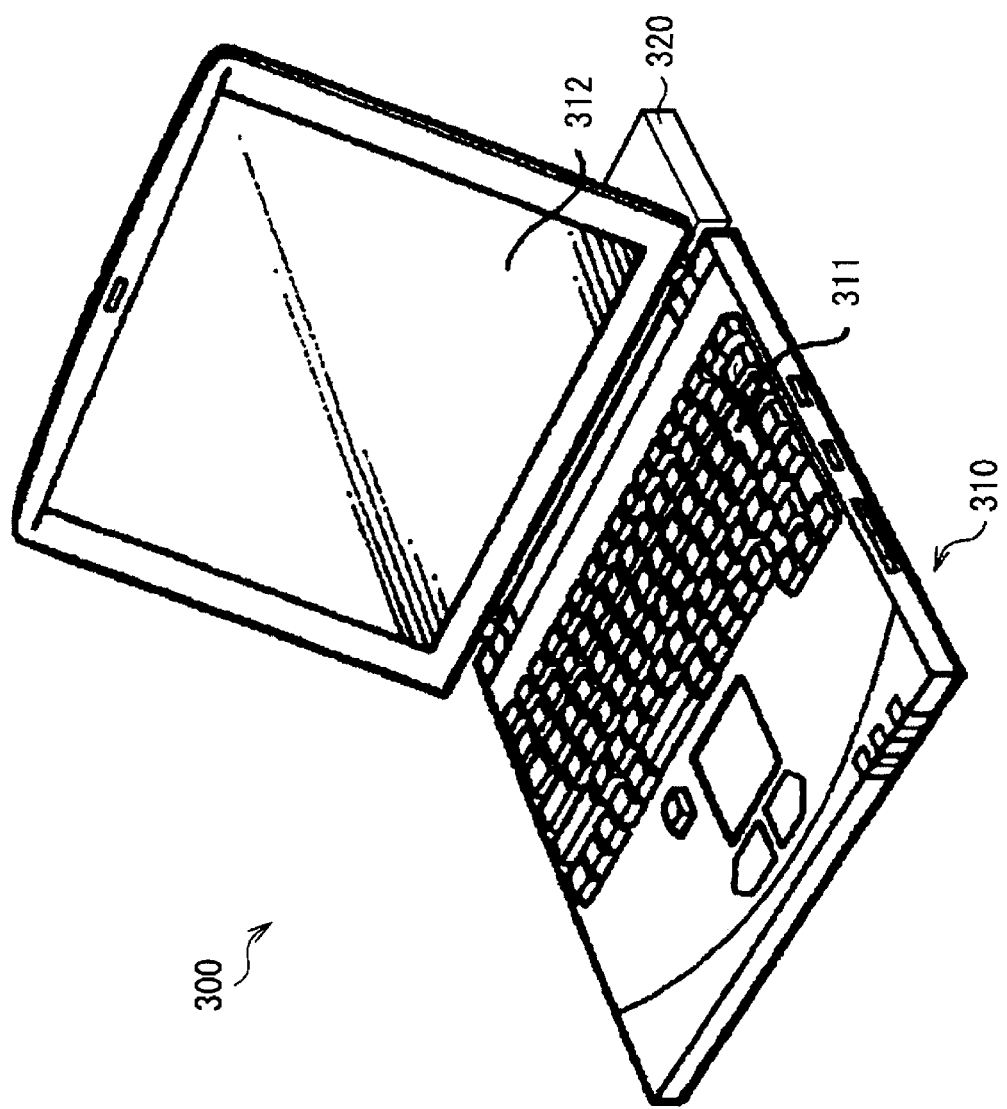
FIG. 17 a perspective view illustrating an application example of the invention.

FIG. 17 illustrates an appearance of an electronic device including the fuel cell described in the foregoing embodiments. An electronic device 300 is a portable electronic device including a device body 310 and a fuel cell 320 such as a notebook personal computer. The device body 310 is driven by electric energy generated in the fuel cell 320.

The device body 310 has an input section 311 including a keyboard and the like for inputting characters and the like and an openable and closable display section 312 for displaying an image. FIG. 17 illustrates the opened display section 312. The fuel cell 320 is attached to the rear face of the device body 310.

The invention has been described with reference to the first and the second embodiments, the example, and the modified examples. However, the invention is not limited to the foregoing embodiments and the like, and various modifications may be made. For example, in the foregoing embodiments and the like, the description has been specifically given of the structures of the power generation section 10, the anode side platy member 20, the cathode side platy member 30, and the fuel supply section 40. However, other structure and other material may be adopted.

Further, for example, in the foregoing embodiments and the like, the description has been given of the case that the power generation section 10 is the flat plate power generation body in which the plurality of unit cells 10A to 10F are layered in the horizontal direction (lamination in-plane direction). However, the invention is able to be applied to a case that the power generation section has one unit cell, or a case that the plurality of unit cells are layered in the longitudinal direction (lamination direction) to structure a fuel cell stack.

Further, for example, the material and the thickness of each element, the method of manufacturing a fuel cell and the like are not limited to those described in the foregoing embodiments and the like. Other material, other thickness, or other method of manufacturing a fuel cell may be adopted. For example, the invention is able to be applied to a case that a liquid electrolyte (electrolytic solution) is used instead of the solid electrolyte film 13.

Further, in the foregoing embodiments and the like, the description has been specifically given of the structure in which the secondary battery 105 is provided in addition to the load 3, and the voltage generated in the power generation section 10 (electro motive force) is used for driving the load 3 or charging the secondary battery 105. However, both the load 3 and the secondary battery 105 are not necessarily provided. That is, it is possible that only the load 3 or only the secondary battery 105 is provided. In addition, the pressor circuit 104 is not necessarily provided as well.

In addition, in the foregoing embodiments and the like, the description has been specifically given of the so-called vaporization type fuel cell in which the liquid fuel F is supplied to the fuel cell 1 and then is vaporized, and the vaporized fuel is supplied to the anode electrode 12 side to perform power generation. However, the power generation section of the invention is not limited to the vaporization type. For example, it is possible that a compressed gas cylinder or the like storing fuel gas is provided as a fuel tank, and the fuel gas is directly supplied from the compressed gas cylinder to the power generation section 10.

Further, in the foregoing embodiments and the like, the description has been specifically given of the structure in which the fuel tank 107 storing the liquid fuel F is built in the fuel cell 1. However, the fuel tank 107 may be externally provided for the fuel cell 1.

Further, in the foregoing embodiments and the like, the description has been specifically given of the groove 22 provided in the anode platy member 20 as a gas exhaust route of the invention. However, the gas exhaust means is not limited to such a groove, but any structure in which gas is able to be exhausted outside through a hole, a piping and the like may be adopted. Further, the gas exhaust section of the invention is not necessarily provided in the anode platy member 20, but for example, a through hole to communicate with outside may be provided in a side wall of the fuel vaporization chamber 41.

Furthermore, in the foregoing embodiments and the like, the description has been specifically given of the fuel cell system 100 including the fuel cell 1, the current detection section 103A, the voltage detection section 103B, the pressor circuit 104, the secondary battery 105, and the control section 102. However, the fuel cell system of the invention is not limited thereto. For example, of the foregoing elements, the current detection section 103A, the voltage detection section 103B, the pressor circuit 104, and the secondary battery 105 are not necessarily provided. It is enough that control to supply the fuel based on the voltage generated in the power generation section at the time of stopping power generation is able to be exercised for a fuel cell having a gas evacuation route.

In addition, the liquid fuel is not limited to methanol, but may be other liquid fuel such as ethanol and dimethyl ether.

Further, the invention is not limited to the vaporization type, but is able to be applied to a case to supply a liquid fuel.

The present application contains subject matter related to that disclosed in Japanese Priority Patent Application JP 2009-079807 filed in the Japan Patent Office on Mar. 27, 2009, the entire contents of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A fuel cell comprising:
   a power generation section having an electrolyte between a cathode electrode and an anode electrode;
   an anode side plate platy member provided on an anode electrode side of the power generation section;
   a fuel vaporization chamber;
   a through hole that is formed in the anode plate member and gives passage between the anode electrode and the fuel vaporization chamber;
   a carbon dioxide exhaust section that guides carbon dioxide generated in the power generation section to each side face of the anode plate member or the fuel vaporization chamber; and
   a valve provided in the carbon dioxide exhaust section.

2. The fuel cell according to claim 1, wherein the carbon dioxide exhaust section is a groove formed from a region corresponding to the anode electrode to a side face outlet on a face opposed to the anode electrode of the anode side plate member.

3. The fuel cell according to claim 2, wherein the groove has a first groove formed in the region corresponding to the anode electrode and a second groove that is branched from the first groove and reaches the outlet.

4. The fuel cell according to claim 3, wherein the valve is provided in the second groove.

5. The fuel cell according to claim 1, wherein the valve is a pressure adjustment valve.

6. The fuel cell according to claim 1, wherein the valve is a check valve.

7. The fuel cell according to claim 2, wherein the groove communicates with the though hole.

8. The fuel cell according to claim 2, wherein the groove is provided in a direction crossing the though hole.

9. The fuel cell according to claim 8, wherein the groove is provided along a side of the region corresponding to the anode electrode, and
the though hole is provided in a direction perpendicular to the groove.

10. The fuel cell according to claim 2, wherein the anode side plate member has an auxiliary groove giving passage between each through hole on a face opposed to the anode electrode.

11. The fuel cell according to claim 10, wherein the auxiliary groove communicates with the groove.

12. The fuel cell according to claim 2 comprising outside the anode side plate member:
a fuel supply section to which a liquid fuel is supplied; and
the fuel vaporization chamber formed between the fuel supply section and the anode side plate member.

13. A fuel cell system comprising:
a power generation section having an electrolyte between a cathode electrode and an anode electrode;
an anode side plate member provided on an anode electrode side of the power generation section;
a fuel vaporization chamber;
a through hole that is formed in the anode plate member and gives passage between the anode electrode and the fuel vaporization chamber;
a carbon dioxide exhaust section that guides carbon dioxide generated in the power generation section to each side face of the anode plate member or the fuel vaporization chamber; and
a valve provided in the carbon dioxide exhaust section, wherein a control section for executing control to supply a fuel to the power generation section in the case where a voltage generated in the power generation section becomes a previously set voltage value or less at the time of stopping power generation is included.

14. An electronic device having a fuel cell comprising:
a power generation section having an electrolyte between a cathode electrode and an anode electrode;
an anode side plate member provided on an anode electrode side of the power generation section;
a fuel vaporization chamber;
a through hole that is formed in the anode plate member and gives passage between the anode electrode and the fuel vaporization chamber;
a carbon dioxide exhaust section that guides carbon dioxide generated in the power generation section to each side face of the anode plate member or the fuel vaporization chamber; and
a valve provided in the carbon dioxide exhaust section.

* * * * *